US012668277B1

(12) United States Patent
    Ingram

(10) Patent No.:     US 12,668,277 B1
(45) Date of Patent:         Jun. 30, 2026

(54) USING COLLISION COSTS TO MAINTAIN SAFE DISTANCES FOR AUTONOMOUS VEHICLES

(71) Applicant: Waymo LLC, Mountain View, CA (US)

(72) Inventor: Benjamin Ingram, Santa Clara, CA (US)

(73) Assignee: Waymo LLC, Mountain View, CA (US)

( * ) Notice:    Subject to any disclaimer, the term of this patent is extended or adjusted under 35 U.S.C. 154(b) by 412 days.

(21) Appl. No.: 18/082,137

(22) Filed:    Dec. 15, 2022

(51) Int. Cl.
    *B60W 30/095*     (2012.01)
    *B60W 30/08*     (2012.01)
    *B60W 40/02*     (2006.01)
    *B60W 60/00*     (2020.01)

(52) U.S. Cl.
    CPC .... *B60W 60/0015* (2020.02); *B60W 30/0956* (2013.01); *B60W 40/02* (2013.01); *B60W 2520/00* (2013.01); *B60W 2554/4046* (2020.02); *B60W 2554/80* (2020.02)

(58) Field of Classification Search
    CPC ........... B60W 30/095; B60W 30/0953; B60W 30/0956; B60W 30/18154; B60W 30/18163; B60W 40/02; B60W 40/04; B60W 60/0015; B60W 60/0016; B60W 60/0017; B60W 2520/00; B60W 2520/10; B60W 2554/00; B60W 2554/4045; B60W 2554/4046; B60W 2554/80; G05D 1/0088; G05D 1/0214; G08G 1/16; G08G 1/163; G08G 1/166; G08G 1/167
    See application file for complete search history.

(56)                References Cited

U.S. PATENT DOCUMENTS 8,660,734  B2     2/2014  Zhu et al.
    10,173,673  B1 *   1/2019  Ferguson ............. G05D 1/0055
    11,150,660  B1 *  10/2021  Kabirzadeh ............ G06F 30/15
  2009/0212930  A1     8/2009  Pfeiffer et al.
  2020/0086855  A1 *   3/2020  Packer ................ G05D 1/0289
  2020/0172093  A1     6/2020  Kum et al.
  2021/0053561  A1 *   2/2021  Beller .................. G08G 1/166
  2021/0055733  A1 *   2/2021  Beller ................. G05D 1/0088
  2021/0370980  A1    12/2021  Ramamoorthy et al.
                 (Continued)

OTHER PUBLICATIONS

"mobileye® Responsibility Sensitive Safety Proposed Rules for an AV 's Driver Test", RSS Product Brief, Mobileye, An Intel Company, pp. 1-2.
                 (Continued)

*Primary Examiner* — Peter D Nolan
*Assistant Examiner* — Ce Li Li
(74) *Attorney, Agent, or Firm* — Botos Churchill IP Law

(57)               ABSTRACT

Aspects of the disclosure provide a method of controlling an autonomous vehicle. The method may include receiving sensor data identifying a road user in a lane adjacent to the autonomous vehicle. A minimum magnitude of road user behavior for the road user that is likely to result in a collision with the autonomous vehicle. A collision cost may be determined based on the determined minimum magnitude of road user behavior and a probability density function of previously observed magnitudes of road user behavior. The autonomous vehicle may be controlled based on the collision cost.

20 Claims, 12 Drawing Sheets

1110 — Receive sensor data identifying a road user in a driving environment of an autonomous vehicle 1120 — Determine a minimum magnitude of road user behavior for the road user that is likely to result in a collision with the autonomous vehicle 1130 — Determine a collision cost based on the determined minimum magnitude of road user behavior and a probability density function of previously observed magnitudes of road user behavior 1140 — Control the autonomous vehicle based on the collision cost

(56) References Cited

U.S. PATENT DOCUMENTS

2022/0126831 A1* 4/2022 Foil ......................... G08G 1/16

OTHER PUBLICATIONS

Kernel Density Estimation, Wikipedia, downloaded from the internet on Dec. 13, 2022, url: https://en.wikipedia.org/wiki/Kernel_density_estimation.
Nvidia Safety Force Field, downloaded from the internet on Oct. 26, 2022, https://www.nvidia.com/en-us/self-driving-cars/safety-force-field/.
Hasuo , "Responsibility-Sensitive Safety", arXiv:2206.03418v1, 2022, pp. 1-10.
Shalev-Shwartz , et al., "On a Formal Model of Safe and Scalable Self-driving Cars", arXiv:1708.06374v6, 2017, 37 Pages.

* cited by examiner

Computing Device(s) 110

Processor(s) 120

Memory 130

Data 132

Instructions 134

User Input 150

Internal Electronic Display 152

Speakers 154

Wireless Network Connection(s) 156

Deceleration System 160

Acceleration System 162

Steering System 164

Signaling System 166

Planning System 168

Routing System 170

Positioning System 172

Perception System 174

Behavior Modeling System 176

Power System (Engine) 178

100

200

322

340

312

310

360

330

320

100

400

600

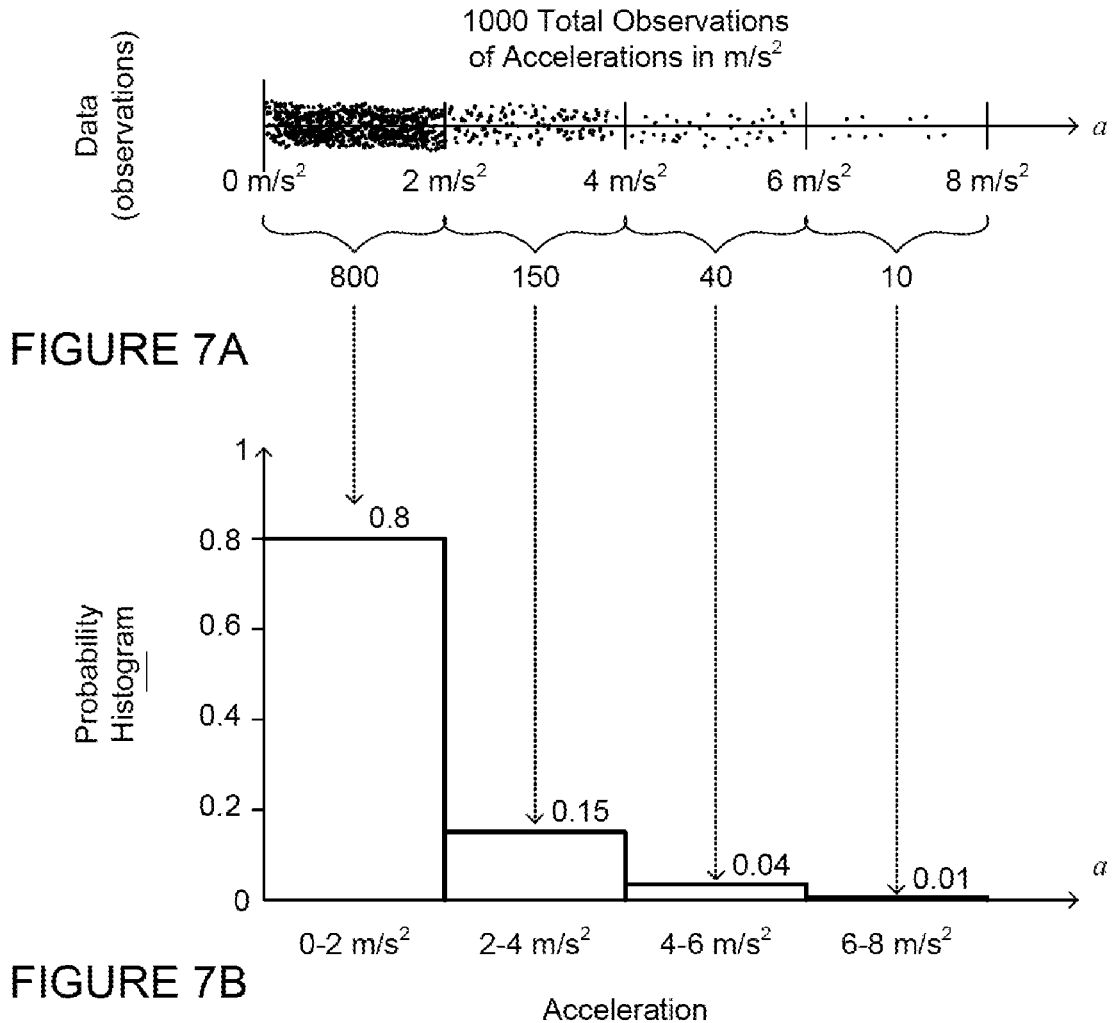
FIGURE 7A
FIGURE 7B
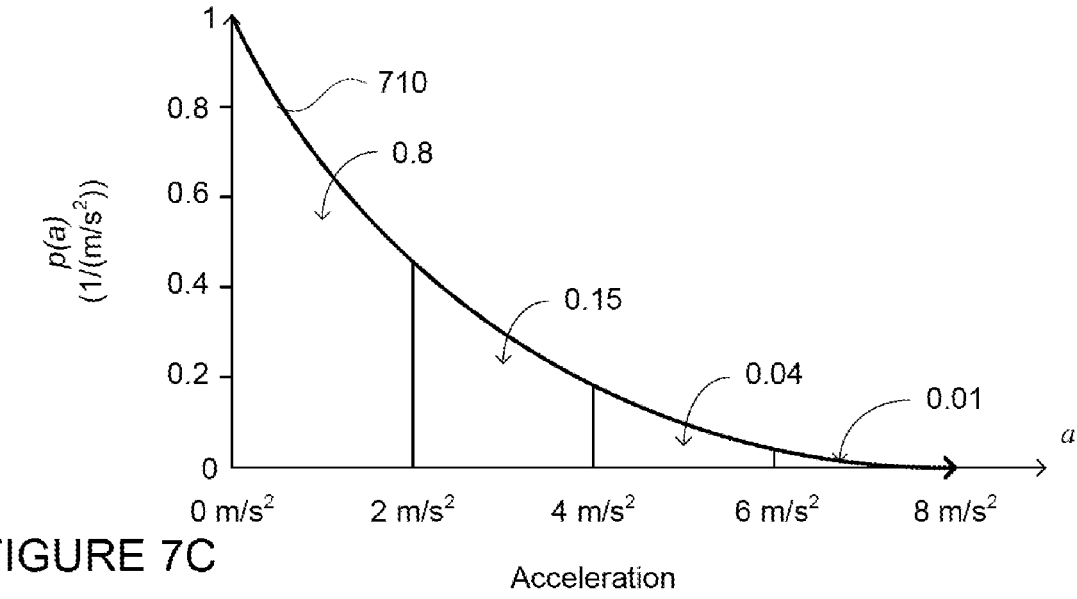
FIGURE 7C

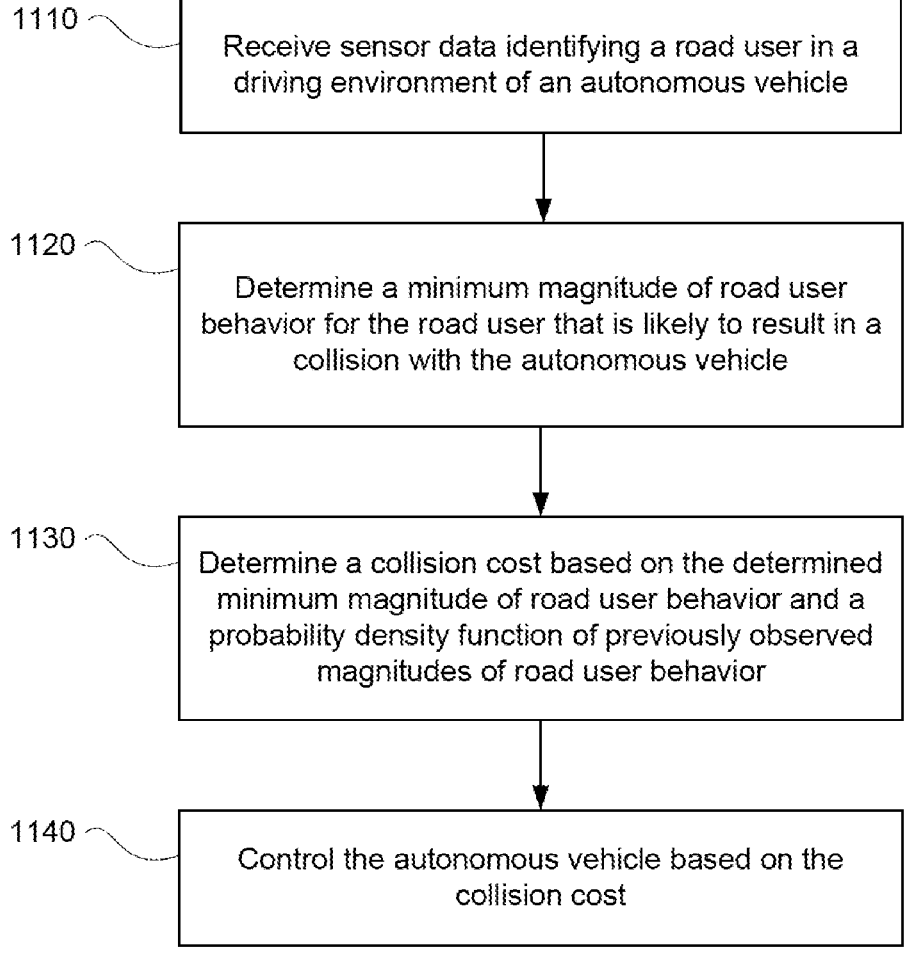

1110 — Receive sensor data identifying a road user in a driving environment of an autonomous vehicle 1120 — Determine a minimum magnitude of road user behavior for the road user that is likely to result in a collision with the autonomous vehicle 1130 — Determine a collision cost based on the determined minimum magnitude of road user behavior and a probability density function of previously observed magnitudes of road user behavior 1140 — Control the autonomous vehicle based on the collision cost

USING COLLISION COSTS TO MAINTAIN SAFE DISTANCES FOR AUTONOMOUS VEHICLES

BACKGROUND

Autonomous vehicles for instance, vehicles that may not require a human driver; can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of controlling an autonomous vehicle. The method includes receiving, by one or more processors, sensor data identifying a road user in a lane adjacent to the autonomous vehicle; determining, by the one or more processors, a minimum magnitude of road user behavior for the road user that is likely to result in a collision with the autonomous vehicle; determining, by the one or more processors, a collision cost based on the determined minimum magnitude of road user behavior and a probability density function of previously observed magnitudes of road user behavior; and controlling, by the one or more processors, the autonomous vehicle based on the collision cost.

In one example, the determined minimum magnitude of road user behavior is a minimum amount of deceleration. In this example, the collision cost goes to zero as the minimum amount of deceleration goes towards a maximum possible braking value. In another example, the determined minimum magnitude of road user behavior is a minimum amount of lateral movement. In another example, determining the collision cost includes integrating over deceleration values and time. In another example, the method also includes, prior to determining the collision cost, identifying a characteristic based on the sensor data and selecting the probability density function from a plurality of probability density functions based on the characteristic. In this example, the characteristic is a speed of the road user. Alternatively, the characteristic is traffic density. Alternatively, the characteristic is an observed behavior of the road user. Alternatively, the characteristic is an observed behavior of a second road user.

In another example, the method also includes, prior to determining the collision cost, identifying a characteristic based on map information and selecting the probability density function from a plurality of probability density functions based on the characteristic. In this example, the characteristic is the autonomous vehicle is approaching a curve. Alternatively, the characteristic is the autonomous vehicle is approaching an intersection. In another example, the method also includes, using the collision cost to generate a trajectory, and controlling the autonomous vehicle is based on the generated trajectory. In another example, the method also includes, using the collision cost to select one of a plurality of generated trajectories, and wherein controlling the autonomous vehicle is based on the selected trajectory. In another example, the determined minimum amount of deceleration for the road user for a situation in which the autonomous vehicle was to move into an adjacent lane in which the road user is located. In another example, the determined minimum magnitude of road user behavior is determined for a situation in which the road user was to move laterally towards the autonomous vehicle.

Another aspect of the disclosure provides a system for controlling an autonomous vehicle. The system includes one or more processors configured to receive sensor data identifying a road user in a lane adjacent to the autonomous vehicle; determine a minimum magnitude of road user behavior for the road user that is likely to result in a collision with the autonomous vehicle if the autonomous vehicle were to move behind the road user; determine a collision cost based on the determined minimum magnitude of road user behavior and a probability density function of previously observed lead agent deceleration magnitudes; and control the autonomous vehicle based on the collision cost.

In one example, the one or more processors are further configured to determine the minimum magnitude of road user behavior that is likely to result in a collision with the autonomous vehicle if the autonomous vehicle were to move into an adjacent lane in which the road user is located. In another example, the system also includes the autonomous vehicle.

BRIEF DESCRIPTION OF THE DRAWINGS

FIGS. 7A, 7B and 7C are visual representations of example data, a histogram of observed road user behaviors as well as an example function p(a) for observed road user behaviors of lead agents in accordance with aspects of the disclosure.

FIG. 11 is a flow diagram in accordance with aspects of the disclosure.

DETAILED DESCRIPTION

Overview

Figure 1:
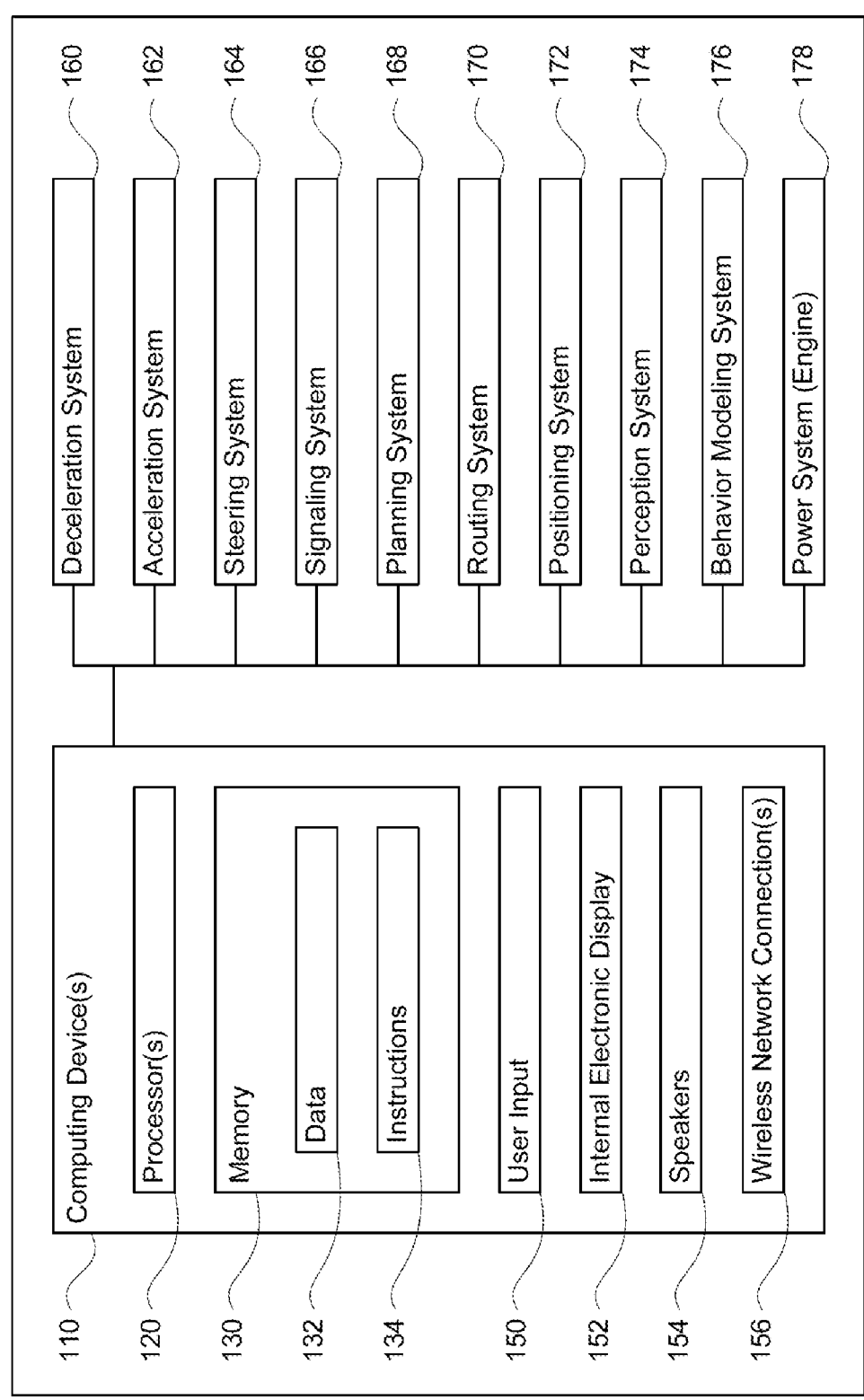
FIG. 1 is a functional diagram of an example vehicle in accordance with an exemplary embodiment.

The technology relates to maintaining safe distances to other road users (e.g., vehicles, motorcyclists, pedestrians etc.) in front or alongside of an autonomous vehicle. Typically, lane changes may require allowing a safe following distance between the autonomous vehicle and a lead vehicle. In some instances, this safe following distance may be a simple function of time and/or distance (e.g., "leave at least 2 seconds ahead, ideally 4 to another vehicle"). Similar distances, e.g., lateral gaps, may be used to avoid collisions with other road users in adjacent lanes or moving alongside of the autonomous vehicles, Other more-sophisticated versions of this may calculate how far an autonomous vehicle needs to follow another road user (e.g., a lead agent) based on avoiding a collision if the lead agent suddenly decelerates or brakes.

However, such approaches do not always work effectively in practice. For example, if all vehicles are following one another according to such metrics and the autonomous vehicle needs to change lanes, cutting-in, or merging, there may not be sufficient gaps to do so (i.e., the gaps may be less than half the safe following distance either ahead or behind the autonomous vehicle). As another example, if another road user cuts-in (e.g., by changing lanes or merging in front of the autonomous vehicle) on the autonomous vehicle, the autonomous vehicle cannot control the initial gap, but may be able to slow down in order to provide a larger gap to the lead agent. In still other examples, if another road user moves towards the autonomous vehicle, the autonomous vehicle may not be able to control the initial lateral gap (e.g., how close another road user moves towards the autonomous vehicle laterally), but may be able to slow down, speed up, nudge or change lanes to move away from the other road user.

In many instances these metrics may also be Boolean (e.g. pass if there is no collision, fail if there is a collision), not making it clear how much worse it is to drive some distance (e.g., 10 cm, 1 meter, 5 meters, etc.) closer in a given situation. In other words, such approaches do not grade on a continuous scale which may be useful for both optimizing a cost and evaluating how close an autonomous vehicle is to passing or failing. As an example, failing by 10 meters may matter more in some situations (such as those with higher speed) than others (such as those with lower speed). As another example, if failure is short lived, this may matter less and enable the autonomous vehicle to make more realistic and useful driving maneuvers (e.g., changing lanes or cutting-into with tighter spaces between the autonomous vehicle and a road user in front of the autonomous vehicle may be possible if the autonomous vehicle is able to brake and increase the space).

In order to address these deficiencies, the autonomous vehicle's planning system may compute a collision probability per unit time based on how often certain behaviors were observed in the past (e.g., observed by this autonomous vehicle or other autonomous or non-autonomous vehicles). Such behaviors may include, for example, levels of acceleration (e.g., negative acceleration or braking) or lateral movement (e.g., lane changes, nudging, etc.) by other road users. This may be used to calculate a cost when planning or selecting a trajectory for the autonomous vehicle to follow.

The features described herein may allow for autonomous vehicles to maintain safe distances relative to other road users (e.g., vehicles, motorcyclists, etc.). This may be particularly useful in situations in which the autonomous vehicle is deciding whether and when to make a lane change as well as other driving situations such as merges and cut-ins, passing other road users including vehicles in adjacent lanes, bicyclists, unparking vehicles, etc. By using the historical observations of other road users, the autonomous vehicle may be discouraged from making lane changes in situations where lead agents may be more likely to brake hard and enable lane changes in situations where there may not initially be a sufficient gap between vehicles to meet the aforementioned metrics. Similarly using the historical observations of other road users, the autonomous vehicle may be discouraged from passing too close (e.g., with greater lateral buffer) to road users where that road user may be more likely to move laterally towards the autonomous vehicle and may enable passing nearer to road users in situations where there may not initially be a minimum desired lateral gap between the vehicle and the other road user by the other road user is likely to increase that gap. In addition, because the costs described herein may take into account collision probability in a continuous manner, the features described herein may also automatically take into account how long a violation of a desired distance to another road user occurs with a more consistent scale. For instance, a higher collision probability can be treated as equally bad (e.g., in terms of the costs described herein) regardless of speed etc.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

For example, a planned trajectory may be provided to the computing devices 110 which may function as a motion control system. Using an estimate of the autonomous vehicle's location and where the planned trajectory indicates the autonomous vehicle should be at the current time, the computing devices may control the steering wheel, powertrain, and brakes. The computing devices 110 may follow that trajectory until the planning system sends a new one, for instance every 0.01 to 0.1, second or more or less. As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
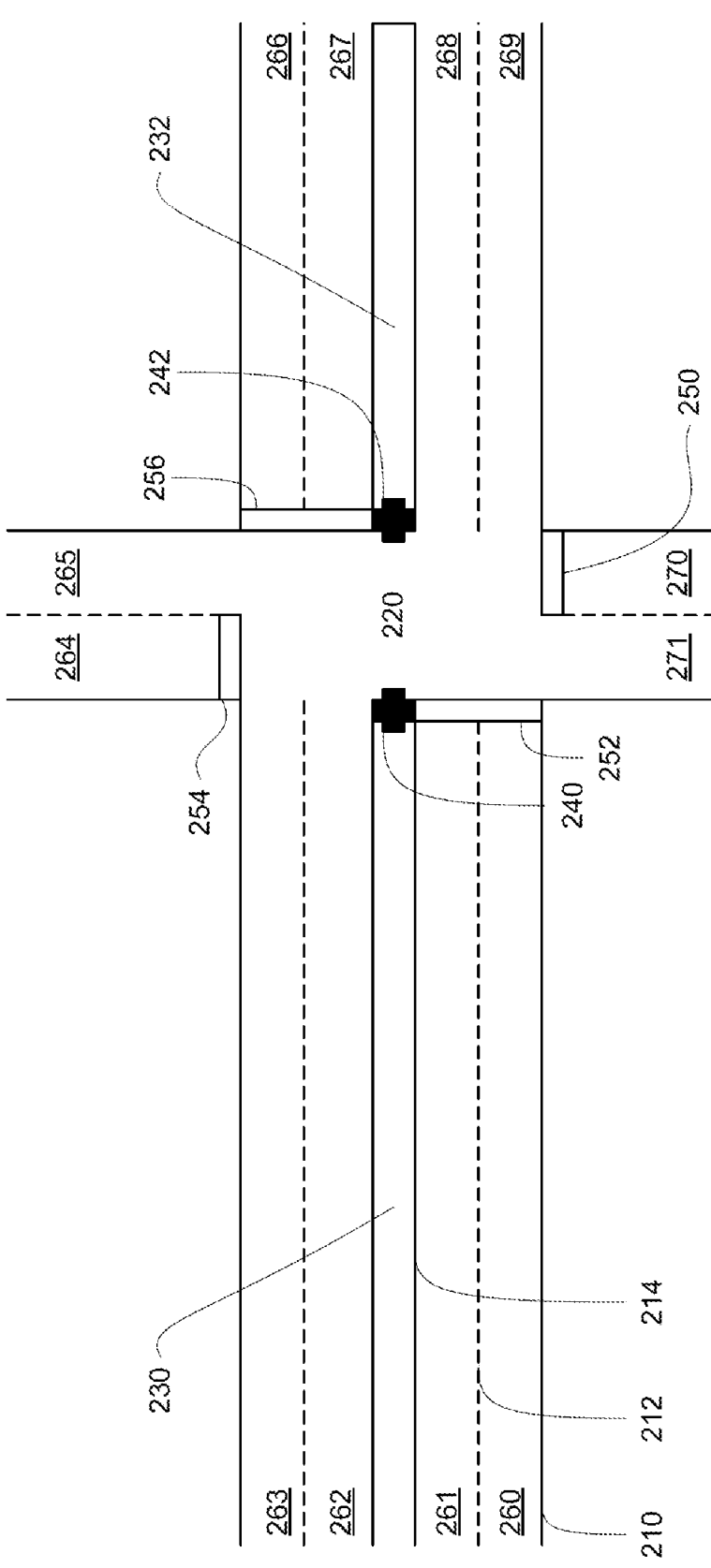
FIG. 2 is an example of map information in accordance with aspects of the disclosure.

FIG. 2 are an example of map information 200 for a section of roadway including intersection 220. FIG. 2 depicts a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
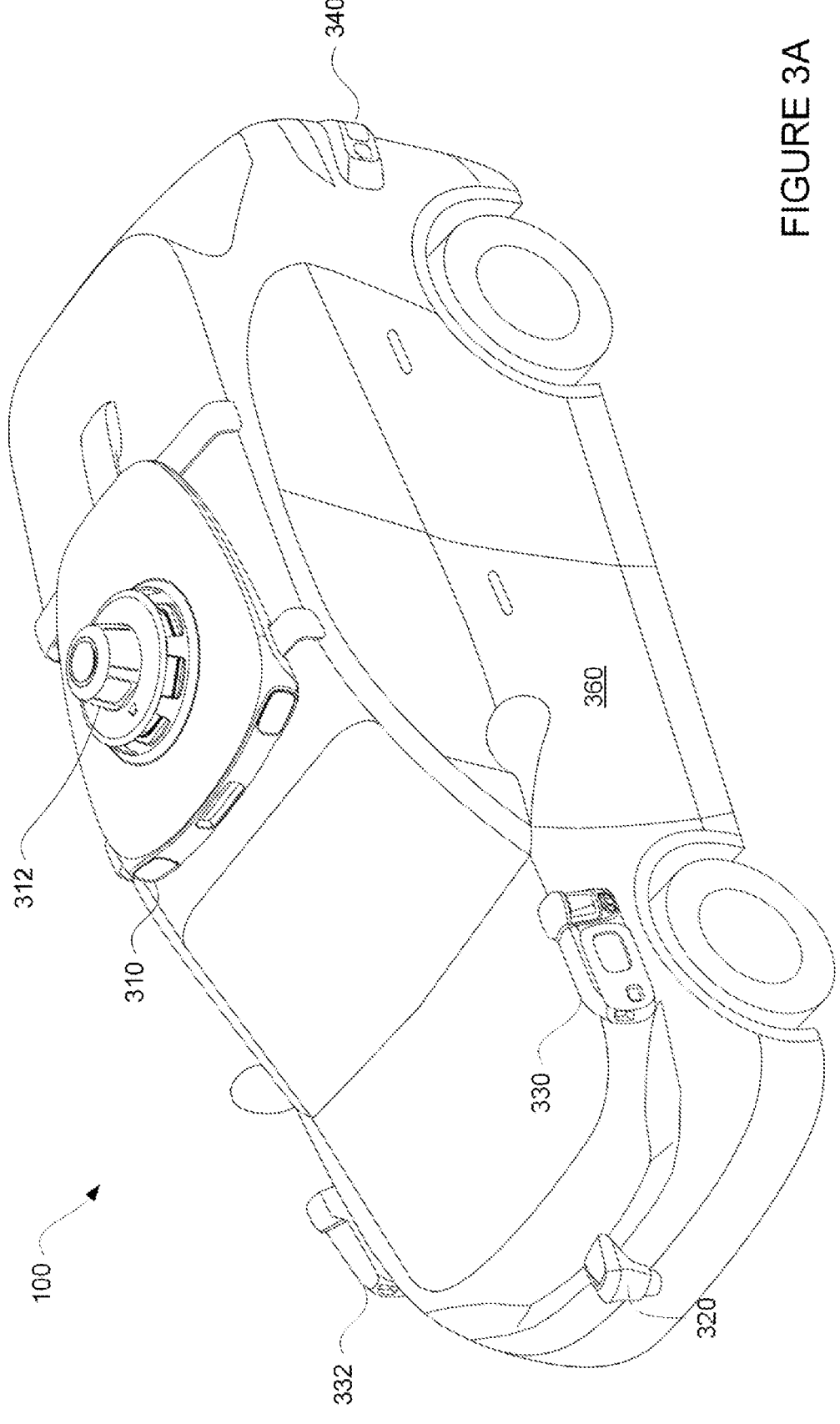
FIG. 3A-3B are example external views of a vehicle in accordance with aspects of the disclosure.
Figure 3B:

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, forward planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
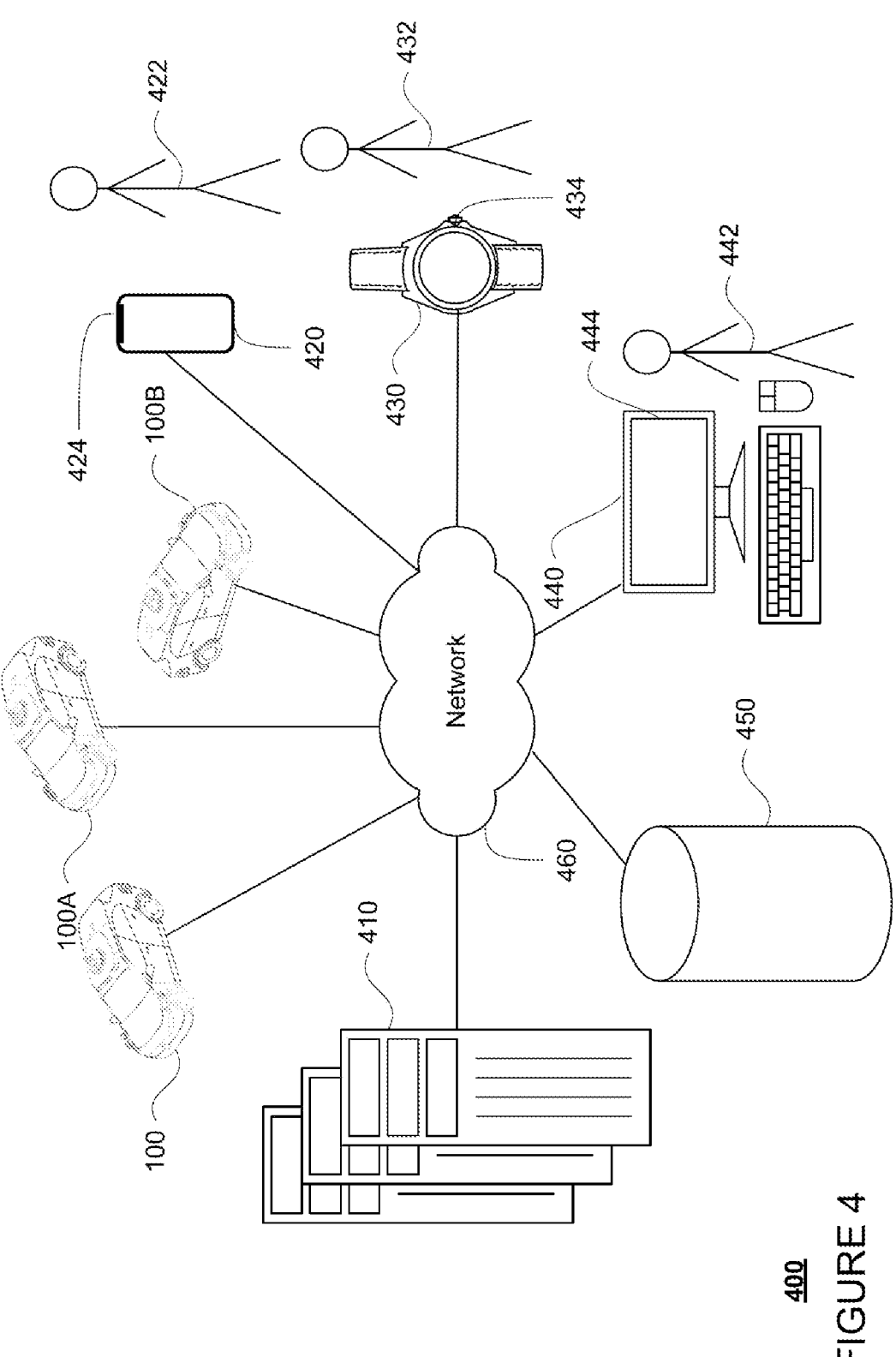
FIG. 4 is a pictorial diagram of an example system in accordance with aspects of the disclosure.
Figure 5:
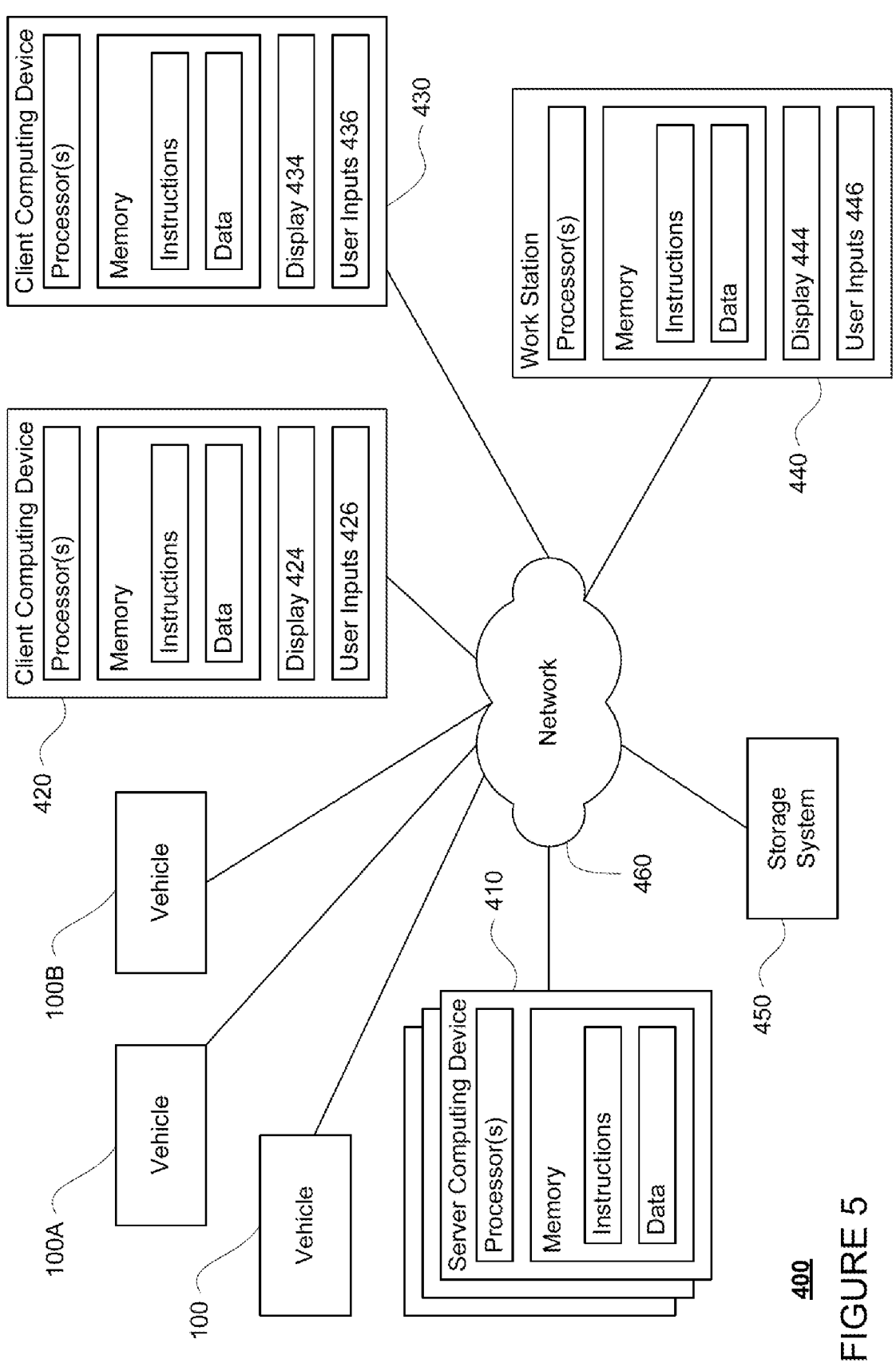
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130; data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for an operations person, for example, a remote assistance operator or someone who may provide remote assistance to an autonomous vehicle and/or a passenger. In other words, user 442 may represent an operator (e.g. operations person) of a transportation service utilizing the autonomous vehicles 100, 100A, 100B. Although only a few passengers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc. Storage system 450 may store various types of information which may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

FIG. 11 is an example flow diagram 1100 for controlling an autonomous vehicle may be performed by one or more processors, such as the one or more processors of the planning system 168 and/or the one or more processors 120 of the computing device 110 of autonomous vehicle 100 or other processors of the autonomous vehicle 100. At block 1110, sensor data identifying a road user in a driving environment of the autonomous vehicle is received.

Figure 6:
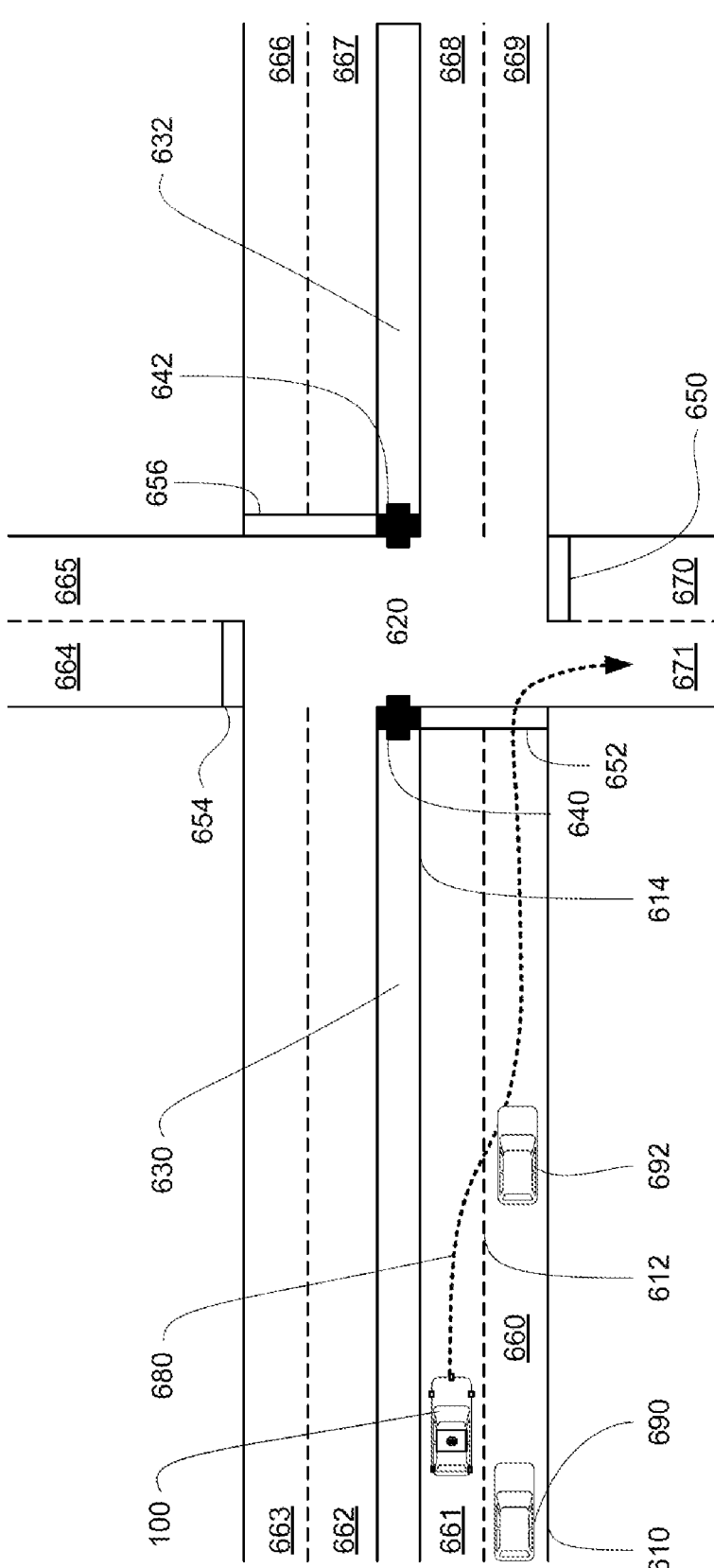
FIG. 6 is an example representation of a driving situation in accordance with aspects of the disclosure.

FIG. 6 depicts autonomous vehicle 100 in a geographic area 600 (e.g., a driving environment) corresponding to the map information 200. In this example, intersection 620 corresponds to intersection 220, lane lines 610, 612, 614 correspond to lane lines 210, 212, 214, median areas 630, 632 correspond to median areas 230, 232, traffic signals 640, 642 correspond to traffic signals 240, 242, stop lines 650, 652, 654, 656 correspond to stop lines 250, 252, 254, 256, and lanes 660-671 correspond to lanes 260-271, and so on. In this example, the autonomous vehicle 100 is traveling in lane 661. The autonomous vehicle may need to change lanes, for example, in order to follow a route 680 to a destination which requires the autonomous vehicle 100 making a turn at intersection 620 into lane 671. In addition, the perception system 174 may generate sensor data identifying the location and other characteristics of road users such as vehicles 690, 692 in lane 660. As noted above, this sensor data may be provided by the perception system 174 to other systems of the autonomous vehicle including the planning system 168 as well as the computing device 110.

Returning to FIG. 11, at block 1120, a minimum magnitude of road user behavior for the road user that is likely to result in a collision with the autonomous vehicle. For example, if the autonomous vehicle were to take a particular action while following a trajectory, this minimum magnitude of road user behavior is likely to result in a collision between the road user and the autonomous vehicle. For example, this minimum magnitude of road user behavior may be determined based upon the relative location of the other road user as well as a future behavior of the autonomous vehicle. In this regard, given a predicted future location of the road user and an expected behavior of an autonomous vehicle given a planned or trajectory that is currently being planned, if the road user were to take at least this minimum magnitude of some type of movement (e.g., acceleration or lateral movement) will result (or rather, would likely result because there will be a high collision probability even though no collision needs to actually occur) in a collision.

For example, in the case of another road user in front of the autonomous vehicle or a "lead agent" in the same lane or in an adjacent lane to which the autonomous vehicle is planning to move into, the minimum magnitude of road user behavior may be a minimum amount of braking (negative deceleration) that would result (or rather, would likely result because there will be a high collision probability even though no collision needs to actually occur) in a collision given the autonomous vehicle's future behavior. In another example, in the case of another road user adjacent to the autonomous vehicle, the minimum magnitude of road user behavior may be a minimum lateral distance or lateral movement that the road user could travel which will result (or rather, would likely result because there will be a high collision probability even though no collision needs to actually occur) in a collision with the autonomous vehicle at a future point in time when the autonomous vehicle is expected to pass that road user.

These minimum magnitudes of road user behavior may be determined at different times t, including the current time (e.g., $t_0=0$) as well as at future times $t_2$, $t_3$ ... T, for instance using intervals of some small value (e.g., dt, where dt is selected in order to be as small as possible but large enough to avoid processing time delays), based on behavior predictions of the other road user generated by the behavior modeling system 176 as well as estimates of where the autonomous vehicle is expected to be according to a planned trajectory or a partially planned trajectory (i.e., where the planning system is currently generating a trajectory). The value of T may refer to some point in time in the future, such as the point in the future when a trajectory is currently planning will end (e.g., 10 seconds into the future) or some maximum amount of time during which the autonomous vehicle 100 is expected to interact with another road user's behavior (e.g., 3 seconds, 10 seconds, or more or less).

Using the acceleration example, value $a_{collision}$ may refer to the minimum magnitude of road user behavior or the minimum amount of deceleration by a lead agent which may result in a collision given the gap at each time step t between the autonomous vehicle 100 and a lead agent for which the collision cost is being calculated. Thus, $a_{collision}$ may be determined using any number of known approaches or equations which take into account the relative locations and speeds of the autonomous vehicle 100 and the lead agent. One such example equation may be represented by:

$$d = \left[ v_r\rho + \frac{X}{2}a_{current}\rho^2 + \frac{(v_{av}+\rho a_{current})^2}{2\beta_{min}} - \frac{v_{ru}^2}{2a_{collision}} \right]_+$$

In this example, d represents the current longitudinal distance between the autonomous vehicle 100, and as indicated by the "+" may be limited to values of zero or greater (no negative values of d). This d may be determined for every time step in [0, T] based on behavior predictions for the road user generated by the behavior modeling system 176. This may enable the use of time-varying values (e.g. separation distance vs. time) in the collision cost C calculation. In addition, $v_{ru}$ represents the current velocity of the road user at each time step, $v_{av}$ represents the current velocity of the autonomous vehicle 100 at each time step, $a_{current}$ represents the current acceleration of the autonomous vehicle 100, $\rho$ represents the reaction time of the autonomous vehicle 100 which may be on the order of less than a second, such as 0.7 second or more or less, $\beta_{min}$ represents a maximum amount of deceleration for the autonomous vehicle 100.

Using the lateral movement example, value $x_{collision}$ may refer to the minimum magnitude of road user behavior or the minimum amount of lateral movement by an adjacent road user may result in a collision given the gap at each time t between the autonomous vehicle 100 and a road user for which the collision cost is being calculated. Thus, $x_{collision}$ may be determined using any number of known approaches or equations which take into account the relative locations and speeds of the autonomous vehicle 100 and the other road user (e.g., the adjacent road user). One such example equation may be represented by:

$$d_{lat} = x_{collision} + \left[ \frac{v_1+v_{1,\rho}}{2}\rho + \frac{v_{1,\rho}^2}{2\alpha_{latbrake}} - \left( \frac{v_2+v_{2,\rho}}{2}\rho - \frac{v_{2,\rho}^2}{2\alpha_{latbrake}} \right) \right]_+$$

In this example, as indicated by the "+", $d_{lat}$ may be limited to positive values or zero (no negative values of d) and may be the lateral distance between the autonomous vehicle and the other road user for every time step in [0, T] based on behavior predictions for the road user generated by the behavior modeling system 176. This may enable the use of time-varying values (e.g. separation distance vs. time) in the collision cost C calculation. In addition, $v_1$ represents the expected current lateral velocity of the autonomous vehicle at each time step, $v_2$ represents the predicted lateral velocity of the road user at each time step, $a_{latbrake}$ represents a maximum amount of lateral braking for the autonomous vehicle, and as in the example, above, $\rho$ represents the reaction time of the autonomous vehicle 100 and the other road user. In some instances, different values for $\rho$ may be used for the autonomous vehicle and the other road user. The value of $v_{1,\rho}$ may be defined by the equation $v_1+\rho a_{latmax}$, where $a_{latmax}$ is the expected or predicted maximum lateral acceleration for the road user or rather, the lateral velocity of the other road user after the reaction time. The value of $v_{2,\rho}$ may be defined by the equation $v_2-\rho a_{latmax}$, where $a_{latmax}$ is the expected or predicted maximum lateral acceleration for the road user.

For example, referring to FIG. 6, the computing devices 110 may determine a minimum magnitude of road user behavior for each of the vehicles 690, 692 based on the relative locations of each of these vehicles as depicted in FIG. 6. In this example, vehicle 690 is located in lane 660 directly adjacent to the autonomous vehicle. In this regard, the computing devices may determine a minimum amount of lateral movement by the vehicle 690 which would cause a collision with the autonomous vehicle at the current time as well as times in the future as described above. In this example, vehicle 692 is located in lane 660 in front of the autonomous vehicle 100. However, because the autonomous vehicle 100 needs to make a lane change, the vehicle 692 may be a lead agent and therefore, the computing devices may determine a minimum amount of braking or deceleration by the vehicle 692 which would cause a collision with the autonomous vehicle at the current time as well as times in the future as described above.

Returning to FIG. 11, at block 1130, a collision cost is determined based on the determined minimum magnitude of road user behavior and a probability density function of previously observed lead agent deceleration magnitudes. As noted above, the determined minimum magnitude of road user behavior may be a plurality of different values for different intervals of time of size dt.

In order to compute a collision probability per unit time based on how often certain road user behaviors were observed in the past (e.g., observed by this autonomous vehicle or other autonomous or non-autonomous vehicles using sensors to detect other road users) and calculate a cost when planning or selecting a trajectory for the autonomous vehicle 100 to follow, a probability density function, represented by p(a) (for negative acceleration or deceleration) or p(x) (for lateral movement). These probability density functions may correspond to previously observed behaviors of road users generally. For example, p(a) may correspond to previously observed lead agent magnitudes of acceleration, and may be used by the by the processors of the planning system 168 or the computing device 110 as a proxy for a prediction of the probability or likelihood of the lead agent initiating sustained deceleration of some magnitude during the interval of size dt. As another example, p(x) may correspond to previously observed lateral movements of other road users, and may be used by the by the processors of the planning system 168 or the computing device 110 as a proxy for a prediction of the probability or likelihood of a road user initiating a lateral movement of some magnitude during an interval of size dt.

Each probability density function may be generated by taking historical observations of other road users, plotting them, and normalizing based on some small difference. In the case of p(a), this small difference may be acceleration (e.g., m/s$^2$), and in the case of p(x) this small difference may be a distance (e.g., m). This may involve bucketizing numbers of observations of different deceleration values into discrete ranges of acceleration values (e.g., a histogram). This histogram may then be discretized (e.g., by dividing by the size of the buckets, e.g., da or dx) and used as the aforementioned probability density function, p(a) or p(x). In some instances, the discretized functions may be converted to a smooth curve or other function using various other techniques for generating probability density functions.

In the example of p(a), this probability density function may be especially useful in situations in which the autonomous vehicle needs to maintain a safe following distance to another road user for lane changes, cut-ins and merges made by the autonomous vehicle 100 or the other road user. This probability density function may also be useful in other situations such as when the autonomous vehicle making a right, left, or U-turn into another lane, and may be used when the autonomous vehicle's trajectory (when planning or planned) moves into a lane of another vehicle or just in front of another vehicle, such as when nudging to the right or left behind another road user making a turn or crossing in front of a lane-splitting road user (e.g., a motorcyclist) when the autonomous vehicle would be or is changing lanes.

In the example of p(x), this probability density function may be especially useful in situations in which the autonomous vehicle an autonomous vehicle needs to maintain a safe lateral distance to another road user, such as when the autonomous vehicle is driving next to a bicyclist in a bicycle lane, an adjacent lane or on a shoulder or where the autonomous vehicle is passing another road users (e.g., a vehicle) which is parked or double-parked or simply passing another road user in an adjacent lane. In this regard, p(x)

may be generated based on observations of how often other road users were observed changing lanes or nudging to the left or right and the magnitude of such changes during an interval of size dt (e.g, as in the case of a vehicle or bicyclist which does not actually changes lanes complete but moves within a lane and possibly an adjacent lane), which are parked or double-parked are observed unparking and the magnitude of such changes during an interval of size dt, which are parked or double-parked are observed opening a driver-side door and the magnitude of the change in position of the door during an interval of size dt, which may be occluded and suddenly move laterally and the magnitude of such movements during an interval of size dt (e.g., as in the example of an occluded pedestrian appearing and moving into a lane, etc.), and so on. In this regard, p(x) may provide a probability of such road users initiating lateral movements that could reach the autonomous vehicle within some predetermined period of time.

In some instances, different probability density functions may be generated for different situations, for example, based on additional characteristics. Such characteristics may be determined from sensor data such as speeds of the other road users (e.g., lead agents and/or those adjacent to the autonomous vehicle), traffic density (e.g., high, medium, or low congestion), observed behavior of other road users (e.g., other road users are changing lanes or not, etc.), etc, and/or map information such as geographic features (e.g., approaching a turn, a curve in the roadway, an intersection, a highway versus surface street). In this regard, each probability density function may be indexed by one or more characteristics, and an autonomous vehicle's planning system may select one or more probability density functions depending on the characteristics of the autonomous vehicle 100's current driving situation.

FIGS. 7A, 7B, and 7C are a visual representations of an example data, an example histogram of observed road user behaviors as well as a corresponding example function p(a) for observed road user behaviors of deceleration magnitudes of lead agents. These representations are for visualization purposes only and do not represent actual observations of road user behavior. In this example, FIG. 7A represents example data for 1000 observations of road user behaviors, here deceleration values ranging from 0 m/s$^2$ to 8 m/s$^2$. In this example, each "dot" represents an observation. Thus, there are 800 observations of road users decelerating between 0 m/s$^2$ and 2 m/s$^2$, representing 80% of the observations. There are also 150 observations of road users decelerating between 2 m/s$^2$ and 4 m/s$^2$, representing 15% of the observations. There are also 40 observations of road users decelerating between 4 m/s$^2$ and 6 m/s$^2$, representing 4% of the observations. Finally, there are 10 observations of road users decelerating between 6 m/s$^2$ and 8 m/s$^2$, representing 1% of the observations.

FIG. 7B represents the data of FIG. 7A as a histogram. The lower axis represents buckets of observations of accelerations in increments or buckets of da equal to 2 m/s$^2$. Of course, other values of da may also be used, and in some instances, A may be selected to be as small as possible. The left axis represents the probability (dimensionless) of observing accelerations within the buckets. In this example, the probability of observing a road user decelerating between 0 m/s$^2$ and 2 m/s$^2$ was 0.8 (80%), the probability of observing a road user decelerating between 2 m/s$^2$ and 4 m/s$^2$ was 0.15 (15%), the probability of observing a road user decelerating between 4 m/s$^2$ and 6 m/s$^2$ was 0.04 (4%), and the probability of observing a road user decelerating between 6 m/s$^2$ and 8 m/s$^2$ was 0.01 (1%).

FIG. 7C represents the data of FIG. 7B as a probability density function, here, p(a) by discretizing the histogram of FIG. 7B by a value smaller than $\Delta a$ (here, 2 m/s$^2$) and normalizing by a value smaller than $\Delta a$ in order to generate a smooth curve and/or may have been fit or converted to a smooth curve using any known technique such as a kernel density estimate. In this example, the area under curve 710 for each value of $\Delta \alpha$ (here depicted as 2 m/s$^2$) corresponds to the probability values of FIG. 7B. In this regard, taking the integral of p(a) between 0 m/s$^2$ and 2 m/s$^2$ provides the value 0.8:

$$\int_0^{\Delta a} p(a) * da = 0.8$$

Similarly, taking the integral of p(a) between 2 m/s$^2$ and 4 m/s$^2$ provides the value 0.15, taking the integral of p(a) between 4 m/s$^2$ and 6 m/s$^2$ provides the value 0.04, and taking the integral of p(a) between 6 m/s$^2$ and 8 m/s$^2$ provides the value 0.01.

Figure 8A:
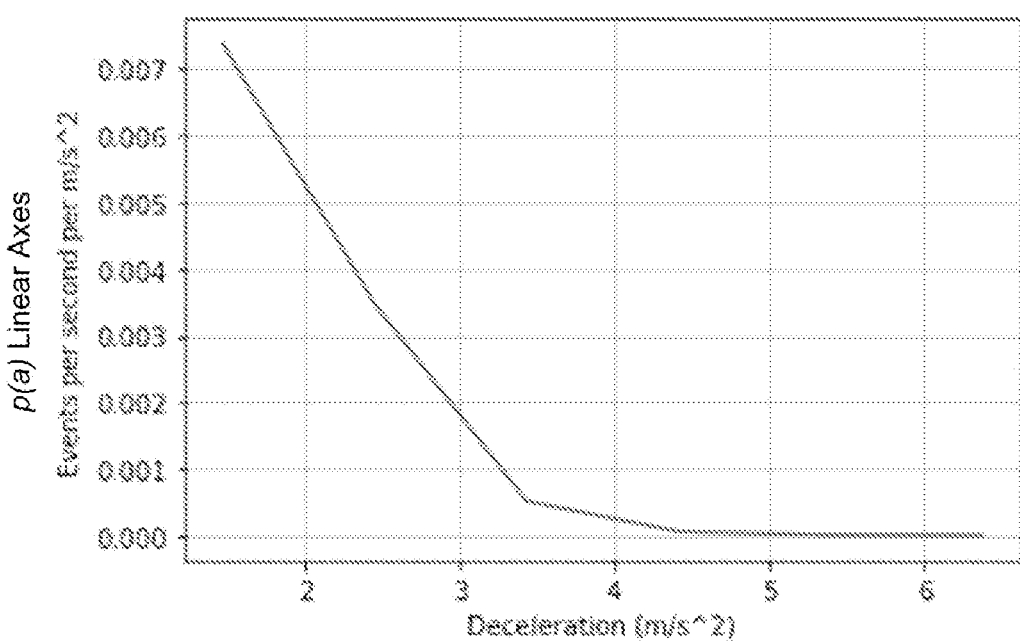
FIGS. 8A and 8B are visual representations of an example function p(a) for observed road user behaviors of lead agents in accordance with aspects of the disclosure.
Figure 8B:
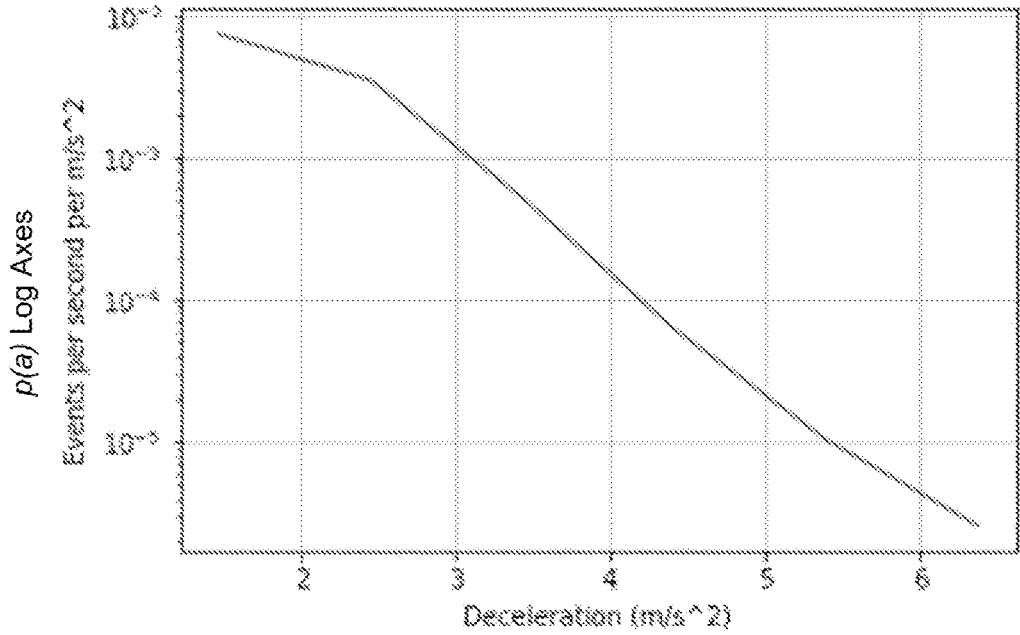

FIGS. 8A and 8B are a visual representations of an example function p(a) for observed road user behaviors of deceleration magnitudes of lead agents. FIG. 8A utilizes a linear axis, and FIGURE SB utilizes a logarithmic axis. These examples of the function p(a) were generated using publicly available data from Virginia Tech Transportation Institute (VTTI) for actual observations of passenger vehicle's decelerations over the course of miles driven by observing vehicles. In this example, the function p(a) was generated by discretizing a histogram by $\Delta(a)$ and normalizing by the bucket width. In addition, each of FIGS. 8A and SB represent an example function p(a) for a plurality of different speed values, and the curve generated using an assumption of an average speed value of 20 miles per hour for the observed road users.

Returning to FIG. 11, at block 1130, a collision cost is determined based on the determined minimum magnitude of road user behavior and a probability density function of previously observed magnitudes of road user behavior. As an example, using the acceleration example, a collision cost $C_a$ may be determined by the processors of the planning system 168 or the computing device 110 using the cost function:

$$C_a = \frac{\int_0^T \int_{a_{collision}}^{a_{maximum}} p(a) * da * dt}{T}$$

In this example, 0 may refer to the current time or $t_0=0$. In this regard, an integral may be taken over some period of time (e.g., 10 seconds or more or less) into the future at time increments of dt. In addition, if the integral was taken only over a small portion (e.g., half) of the expected interaction time with the other road user, the result may be longer periods of low risk even though the total collision probability was the same.

Referring back to the cost function, the value $a_{maximum}$ may represent an infinite amount of deceleration or braking by the lead agent or some maximum deceleration value (e.g., 8 m/s$^2$ or more or less) that may be expected for a road user generally (e.g., vehicles aren't physically able to decelerate faster than $a_{maximum}$). In this regard, an integral may be taken over a range of deceleration values from a minimum value that is likely to or will result in a collision to a maximum or infinite value at deceleration increments of da.

Again referring back to the cost function above, as the value of $a_{collision}$ increases (e.g., approaches $a_{maximum}$), the cost function will go to zero because p(a) or the likelihood of another road user breaking at a very high rate of deceleration will go to zero. Thus, this collision cost can be discarded or ignored in situations in which there are no other road users or other road users are too far away from the autonomous vehicle 100 that any possible level of braking would not result in a collision. In this regard, the collision cost $C_a$ may only be calculated when the autonomous vehicle 100 is changing lanes/cutting-in and merging and/or when there are vehicles located in an adjacent lane within a predetermined distance ahead of the autonomous vehicle 100.

As an example, using the lateral movement example, a collision cost $C_x$ may be determined by the processors of the planning system 168 or the computing device 110 using the cost function:

$$C_x = \frac{\int_0^T \int_{x_{collision}}^{x_{maximum}} p(x) * dx * dt}{T}$$

Again, 0 may refer to the current time or $t_0=0$. In this regard, an integral may be taken over some period of time (e.g., 10 seconds or more or less) into the future at time increments of dt. In addition, if the integral was taken only over a small portion (e.g., half) of the expected interaction time with the other road user, the result may be longer periods of low risk even though the total collision probability was the same.

Referring back to the cost function, the value $x_{maximum}$, may represent a maximum amount of lateral buffer the autonomous vehicle might be expected to leave, for example a full lane width, or the maximum amount a road user has been observed to move laterally in the time before the autonomous vehicle passes that road user. In this regard, an integral may be taken over a range of lateral movement values from a minimum value that is likely to or will result in a collision to a maximum or infinite value at distance increments of dx. In this regard, dx may be selected to be as small as possible, or for example, as large as the buckets described above.

Again referring back to the cost function above, as the value of $x_{collision}$ increases (e.g., approaches $x_{maximum}$), the cost function will go to zero because p(x) or the likelihood of another road user moving so far will go to zero (i.e., beyond the maximum amount of lateral buffer or amount a road user has been observed to move laterally as in the example above). Thus, this collision cost can be discarded or ignored in situations in which there are no other road users or other road users are too far away from the autonomous vehicle 100 that any possible level of lateral movement would not result in a collision. In this regard, the collision cost $C_x$ may only be calculated when the autonomous vehicle 100 is passing another road user in another driving lane, bicycle lane, or shoulder or when there are vehicles located in an adjacent lane within a predetermined distance ahead of the autonomous vehicle 100.

The computing devices 100 may determine the collision costs for each of the vehicles 690 and 692. For example, the autonomous vehicle may calculate a value for $C_a$ or $C_x$ for each of the vehicles 690 and 692 depending on the current locations of the autonomous vehicle and these vehicles, the predicted locations of these road users, as well as the expected location of the autonomous vehicle according to a generated trajectory or a trajectory in the process of being generated.

Returning to FIG. 11, at block 1140, the autonomous vehicle is controlled based on the collision cost. The collision cost determined using the cost functions $C_a$ or $C_x$ may then be used to generate and/or select a trajectory. In this regard, none, one or both of these collision costs may be used at the same time depending upon the location of other road users in the autonomous vehicle's driving environment. In this regard, different events could initiate a collision with the same road user. For example, lateral motion when the autonomous vehicle is alongside another road user, or deceleration when behind that same road user. Thus, different costs may be calculated at the same or different time steps for the same road user (and the same trajectory).

For instance, a collision cost may be used by the processors of the planning system 168 or the computing device 110 while planning the geometry (shape) and speed for a particular trajectory. As an example, the collision cost $C_a$ may enable the autonomous vehicle to effectively determine whether a lane change by the autonomous vehicle 100 should be discouraged or not or to trade a close following for other benefits, e.g. progress, to choose whether the autonomous vehicle 100 should a maneuver like a lane change, and to choose how to make it (e.g. how fast the autonomous vehicle 100 would need to decelerate in order create more space between the autonomous vehicle 100 and the lead agent after changing lanes/cutting-in or merging). In this regard, a higher collision cost may discourage lane changes or make the autonomous vehicle 100 less likely to make a lane change during its next trajectory, while a lower collision cost may make the generation of trajectories involving lane changes more likely, even in situations where there are insufficient gaps to meet the aforementioned metrics. The planned trajectory may then be sent to various other systems of the autonomous vehicle 100 in order to control the autonomous vehicle in an autonomous driving mode as described above.

As another example, the collision cost $C_a$ may enable the autonomous vehicle to effectively determine how long the autonomous vehicle 100 may ride in another road user's blind spot area, for planning how long the autonomous vehicle 100 may ride adjacent to another road user such as a vehicle, bicyclist, motorcyclist or pedestrian, and so on. In any of these instances, these collision costs may lead to the autonomous vehicle 100 driving closer to an individually-parked (i.e., a single) vehicle and farther from a plurality (i.e., a row) of parked vehicles. In other cases, these collision costs may lead to the autonomous vehicle 100 driving closer to parked vehicles that have been parked longer than those that have been only recently parked (or vice versa).

Figure 9:
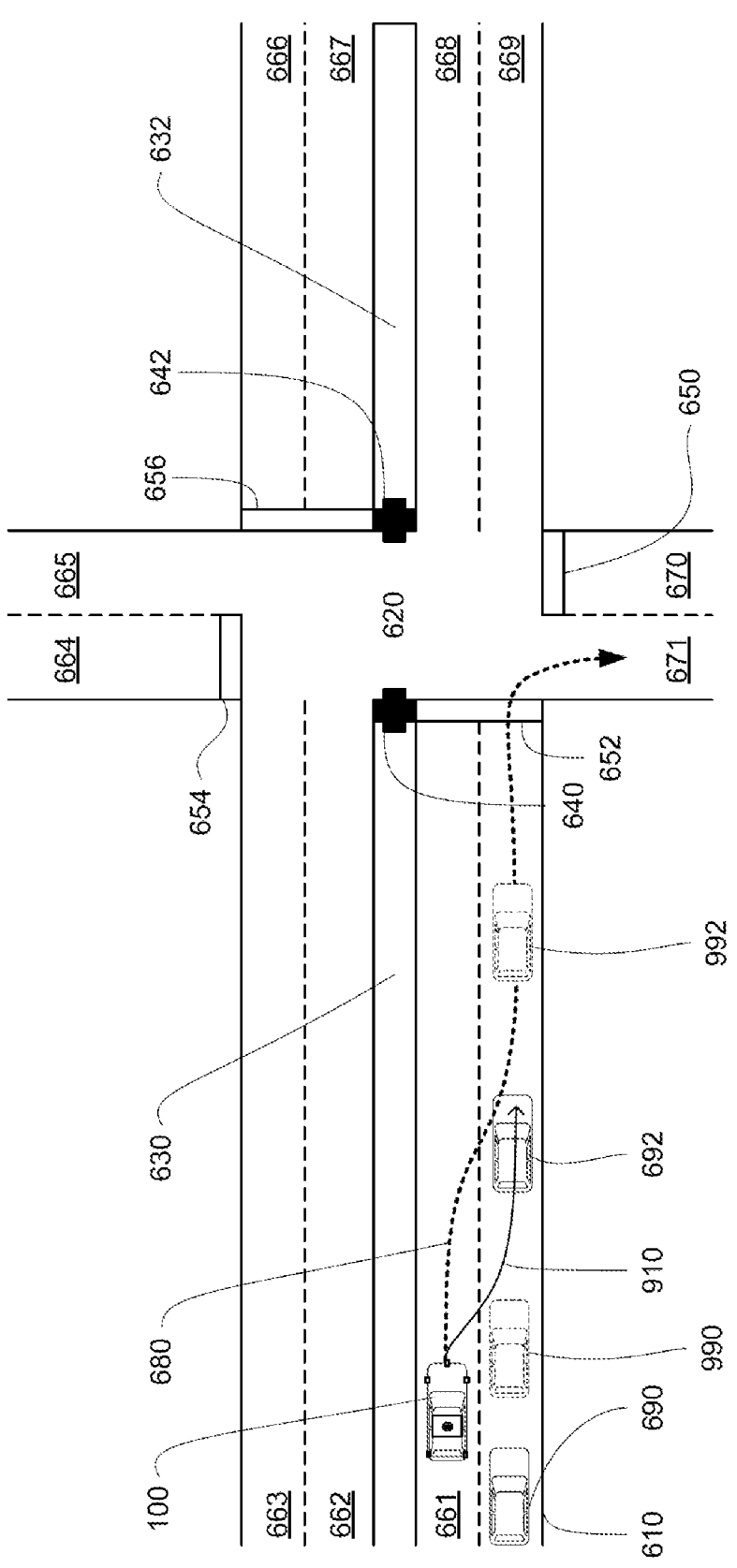
FIG. 9 is an example representation of a driving situation and trajectory in accordance with aspects of the disclosure.

As an example, FIG. 9 is an example trajectory 910 which may be determined with the use of the cost function described above. This trajectory may enable the autonomous vehicle 100 to change lanes, pulling between the vehicles 690, 692 and thereafter slowing down in order to create a safe following distance, or behind these vehicles depending upon how the cost function affects the shape of the trajectory. In this example, the predicted future locations of vehicles 690, 692 (from the behavior modeling system 176) at the time when the autonomous vehicle 100 would reach the end of the trajectory 810 are represented by dashed-line vehicles 990, 992.

In addition, or alternatively, the collision costs $C_a$ and/or $C_x$ (depending upon the driving environment described above) may be used by the processors of the planning system or computing devices 110 while selecting one of a plurality of trajectories. In this regard, the collision cost may be weighted with some value (e.g., 1 or more) depending on how important the collision cost is relative to other costs used to select from a plurality of generated trajectories. In some situations, the weight may be increased, such as when the autonomous vehicle 100 has detected an erratic driver or in higher congestion situations. The selected trajectory may then be sent to various other systems of the autonomous vehicle 100 in order to control the autonomous vehicle in an autonomous driving mode as described above.

In this regard, a higher collision cost $C_a$ may make the autonomous vehicle 100 less likely to select trajectories involving lane changes, while a lower collision cost may make selection of trajectories involving lane changes more likely, even in situations where there are insufficient gaps to meet the aforementioned metrics. Similarly, the collision cost $C_x$ may enable the autonomous vehicle to select trajectories that enable the autonomous vehicle 100 to ride longer or shorter amounts of time in another road user's blind spot area, or simply adjacent to bicyclist, motorcyclist or pedestrian, and so on. In any of these instances, these collision costs may lead to the autonomous vehicle 100 driving closer to an individually-parked (i.e., a single) vehicle and farther from a plurality (i.e., a row) of parked vehicles. Similarly, these collision costs may lead the autonomous vehicle 100 spending less time next to a bicyclist whose position is more likely to vary laterally, such as when climbing or descending a hill. In other cases, the collision cost $C_x$ may lead to the autonomous vehicle 100 driving closer to parked vehicles that have been parked longer than those that have been only recently parked (or vice versa).

Figure 10:
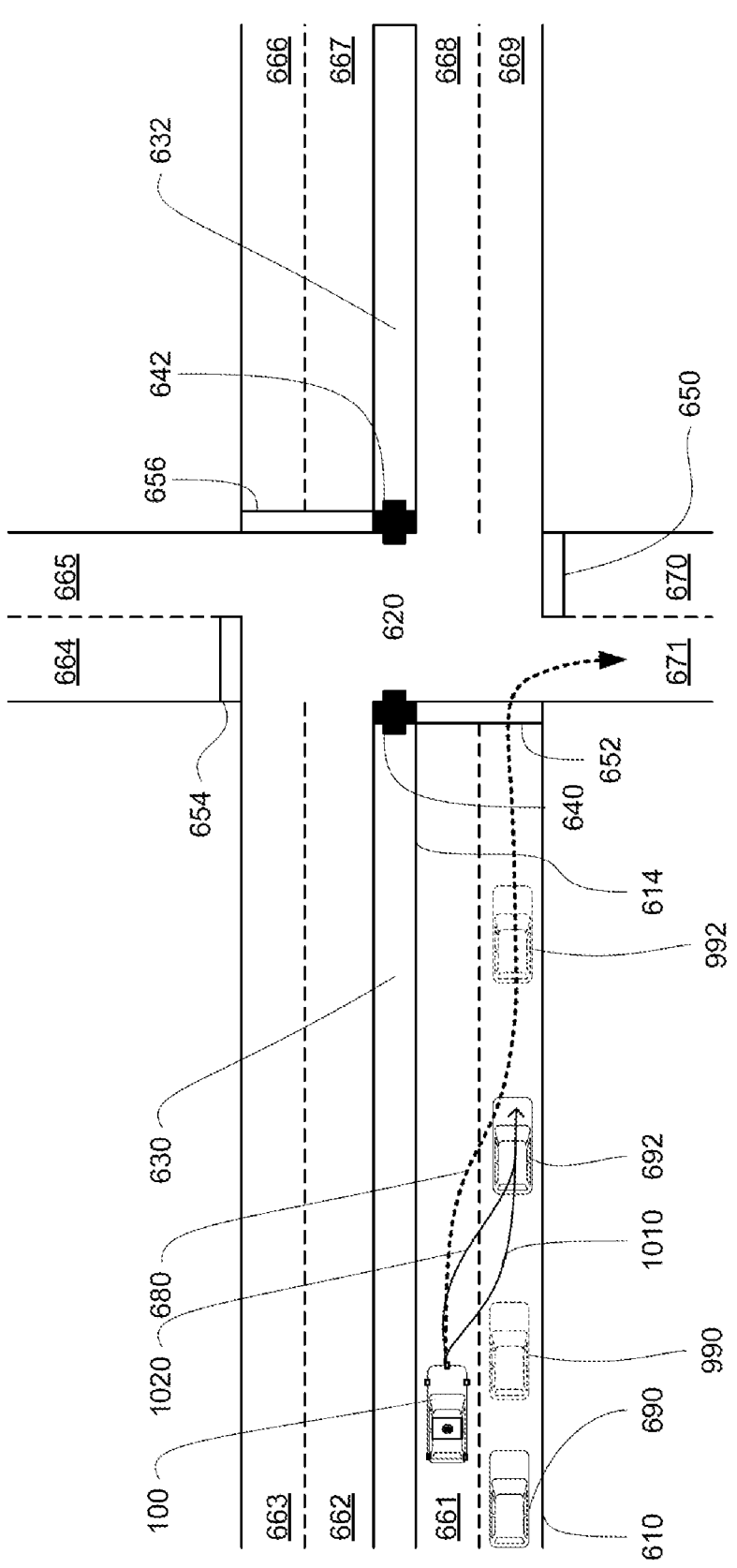
FIG. 10 is an example representation of a driving situation and trajectories in accordance with aspects of the disclosure.

As an example, FIG. 10 is an example of a plurality of trajectories 1010, 1020 which may be generated by a planning system of the autonomous vehicle 100 with or without the use of the cost function described above. Depending upon the value of the collision cost for each of these trajectories, the planning system or computing device 110 may select one or the other of trajectories 1010, 1020. The selected trajectory may enable the autonomous vehicle 100 to change lanes, pulling past vehicle 690 and thereafter between the vehicles 690, 692 or alternatively, behind these vehicles. As with the example of FIG. 9, in this example, the predicted future locations of vehicles 690, 692 (from the behavior modeling system 176) at the time when the autonomous vehicle 100 would reach the end of the trajectory 1010 or 1020 are represented by dashed-line vehicles 990, 992.

In some instances, the collision cost may also be used in simulations or offline evaluation tools. For instance, the collision cost may be used to measure how well the autonomous vehicle 100's control software is at achieving safe following distances if changes are made to the autonomous vehicle 100's control software (e.g., did this change make any difference, a large difference, a small difference, etc.). Similarly, the collision cost may be used to evaluate whether a version of the autonomous vehicle 100's control software is considered safe enough to use in actual autonomous vehicles (e.g., on a road with other road users). In still other examples, the collision cost may be used to compare how the autonomous vehicle 100 performs as compared to good human driving metrics in similar situations, to whether or not a real or simulated autonomous vehicle's driving is acceptable (i.e., safe or desirable).

In other examples, the collision cost may be used to determine the behavior of other simulated road users in a simulation. In such instances, different parameters and weights may be used for different simulated agents or simulations to capture different types of driving behavior for other simulated road users (e.g. some being willing to accept more risk, some being willing to accept low risks for longer but not high risks for shorter, etc.).

Although the features described above relate to fully-autonomous driving modes and trajectory planning, the features described herein may be used as a notification-only system in a fully manually-driven vehicle or an autonomous vehicle being driven in a manual or semi-autonomous driving mode. For example, if the collision cost for a particular situation becomes too high (e.g., greater than a threshold), one or more notifications may be provided (e.g., visually by displaying to the driver on a display of a vehicle and/or audibly via a message played over a speaker of the vehicle). Such notifications may be used to indicate whether the vehicle is too close to another road user (e.g., behind or adjacent to the other road user). For example, a notification may indicate to a driver that the driver has been driving too close to another road user for too long. Other notifications could be used to give drivers feedback about their driving and may be particularly useful to insurance companies and fleets of vehicles (e.g., construction, taxi service, bussing, logistics providers etc, which may utilize driver monitoring systems). In some instances, these notifications may be accumulated over time to identify trends that affect insurance rates or which drivers in a fleet are engaged with in order to improve driving safety.

The features described herein may allow for autonomous vehicles to maintain safe distances relative to other road users (e.g., vehicles, motorcyclists, etc.). This may be particularly useful in situations in which the autonomous vehicle is deciding whether and when to make a lane change as well as other driving situations such as merges and cut-ins, passing other road users including vehicles in adjacent lanes, bicyclists, unparking vehicles, etc. By using the historical observations of other road users, the autonomous vehicle may be discouraged from making lane changes in situations where lead agents may be more likely to brake hard and enable lane changes in situations where there may not initially be a sufficient gap between vehicles to meet the aforementioned metrics. Similarly using the historical observations of other road users, the autonomous vehicle may be discouraged from passing near to road users where that road user may be more likely to move laterally towards the autonomous vehicle and may enable passing nearer to road users in situations where there may not initially be a minimum desired lateral gap between the vehicle and the other road user by the other road user is likely to increase that gap. In addition, because the costs described herein may take into account collision probability in a continuous manner, the features described herein may also automatically take into account how long a violation of a desired distance to another road user occurs with a more consistent scale. For instance, a higher collision probability can be treated as equally bad (e.g., in terms of the costs described herein) regardless of speed etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of controlling an autonomous vehicle, the method comprising:
   receiving, by one or more processors, sensor data identifying a road user in a lane adjacent to the autonomous vehicle;
   determining, by the one or more processors, a minimum magnitude of road user behavior for the road user that is likely to result in a collision with the autonomous vehicle;
   determining, by the one or more processors, a collision cost based on the determined minimum magnitude of road user behavior and a probability density function of previously observed magnitudes of road user behavior; and
   controlling, by the one or more processors, the autonomous vehicle based on the collision cost.

2. The method of claim 1, wherein the determined minimum magnitude of road user behavior is a minimum amount of deceleration.

3. The method of claim 2, wherein the collision cost goes to zero as the minimum amount of deceleration goes towards a maximum possible braking value.

4. The method of claim 1, wherein the determined minimum magnitude of road user behavior is a minimum amount of lateral movement.

5. The method of claim 1, wherein determining the collision cost includes integrating over deceleration values and time.

6. The method of claim 1, further comprising, prior to determining the collision cost:
   identifying a characteristic based on the sensor data; and
   selecting the probability density function from a plurality of probability density functions based on the characteristic.

7. The method of claim 6, wherein the characteristic is a speed of the road user.

8. The method of claim 6, wherein the characteristic is traffic density.

9. The method of claim 6, wherein the characteristic is an observed behavior of the road user.

10. The method of claim 6, wherein the characteristic is an observed behavior of a second road user.

11. The method of claim 1, further comprising, prior to determining the collision cost:
   identifying a characteristic based on map information; and
   selecting the probability density function from a plurality of probability density functions based on the characteristic.

12. The method of claim 11, wherein the characteristic is the autonomous vehicle is approaching a curve.

13. The method of claim 11, wherein the characteristic is the autonomous vehicle is approaching an intersection.

14. The method of claim 1, further comprising, using the collision cost to generate a trajectory, and wherein controlling the autonomous vehicle is based on the generated trajectory.

15. The method of claim 1, further comprising, using the collision cost to select one of a plurality of generated trajectories, and wherein controlling the autonomous vehicle is based on the selected trajectory.

16. The method of claim 1, wherein the determined minimum magnitude of road user behavior is determined for a situation in which the autonomous vehicle was to move into an adjacent lane in which the road user is located.

17. The method of claim 1, wherein the determined minimum magnitude of road user behavior is determined for a situation in which the road user was to move laterally towards the autonomous vehicle.

18. A system for controlling an autonomous vehicle, the system comprising one or more processors configured to:
receive sensor data identifying a road user in a lane adjacent to the autonomous vehicle;
determine a minimum magnitude of road user behavior for the road user that is likely to result in a collision with the autonomous vehicle if the autonomous vehicle were to move behind the road user;
determine a collision cost based on the determined minimum magnitude of road user behavior and a probability density function of previously observed lead agent deceleration magnitudes; and
control the autonomous vehicle based on the collision cost.

19. The system of claim 18, herein the one or more processors are further configured to determine the minimum magnitude of road user behavior that is likely to result in a collision with the autonomous vehicle if the autonomous vehicle were to move into an adjacent lane in which the road user is located.

20. The system of claim 18, further comprising the autonomous vehicle.

* * * * *